United States Patent [19]

Claasen et al.

[11] 4,100,378

[45] Jul. 11, 1978

[54] CROSS-CORRELATION ARRANGEMENT

[75] Inventors: Theodoor Antonius Carel Maria Claasen; Johannes Bernhard Heinrich Peek, both of Eindhoven, Netherlands

[73] Assignee: U.S. Philips Corporation, New York, N.Y.

[21] Appl. No.: 728,796

[22] Filed: Oct. 1, 1976

[30] Foreign Application Priority Data

Oct. 6, 1975 [NL] Netherlands ............ 7511707

[51] Int. Cl.² .................. G01R 23/02; H04M 1/50
[52] U.S. Cl. ...................... 179/84 VF; 364/484; 364/728; 328/138
[58] Field of Search ........... 179/84 VF; 343/50 P, 343/100 CL; 235/181; 328/138; 324/78 D, 77 B, 77 G; 364/484, 728, 604

[56] References Cited

U.S. PATENT DOCUMENTS

| 3,866,118 | 2/1975 | Ghosh et al. ............ 324/77 G |
| 3,882,283 | 5/1975 | Proudfoot ............. 179/84 VF |
| 3,937,899 | 2/1976 | Denenberg ............. 328/138 |
| 4,001,521 | 1/1977 | Fukata et al. ........... 179/84 VF |
| 4,021,653 | 5/1977 | Sharp et al. ........... 324/78 D |
| 4,025,730 | 5/1977 | Sawai ................ 179/84 VF |

FOREIGN PATENT DOCUMENTS 1,267,272  5/1968  Fed. Rep. of Germany ... 179/84 VF

Primary Examiner—Felix D. Gruber
Attorney, Agent, or Firm—Frank R. Trifari; Henry I. Steckler

[57] ABSTRACT

Cross-correlation arrangement for determining the presence or absence of a signal $x_2(t)$ of known frequency in an unknown signal $x_1(t)$ if this signal $x_2(t)$ is present for at least a period of time $\tau_o$ with an unknown starting instant. An auxiliary signal $a_1(t)$ is added to the signal $x_2(t)$. The sum signal is converted into one-bit code words $s(nT)$ which are multiplied in at least a first correlation channel by one-bit code words $y_{per}(kT)$ which are stored in a storage medium having at least N/2 addressable storage locations. The code words $y_{per}(kT)$ are elements of a series $\{y_{per}(kT)\}$ which is formed by the code words which occur in a predetermined time interval having a length NT and which are of a non-periodical signal of the form sign $[x_2(t) + a_2(t)]$. The product code words obtained are added together in an integrator. This integrator is read each time after a time interval NT and reset. The absolute value of an output code word of the integrator is optionally added to corresponding code words of other correlation channels. The sum code words obtained in this way are integrated in a second integrator whose contents is continuously compared with a detection level. If $N_o = \tau_o/T$, N is smaller than $N_o$ for example a factor of 3. The value of N determines the width of the detection characteristic.

4 Claims, 7 Drawing Figures

CROSS-CORRELATION ARRANGEMENT

BACKGROUND OF THE INVENTION

1. Field of the Invention

The invention relates to a cross-correlation arrangement for determining the presence or absence of at least one tone signal $x_2(t)$ of known frequency in an information signal $x_1(t)$ whose shape and frequency is unknown.

Such arrangements are frequently used in receivers of communication systems, for example for detecting tone signaling signals in telephone systems; for detecting the various frequencies with which telegraph signals are transmitted in an a-synchronous telegraph system and also in radar systems, selective calling systems and paging systems.

2. Description of the Prior Art.

An arrangement as described above is indicated in reference 4 below. In this known arrangement the generation means produce a signal $y(t)$ which is constituted by the sum of the known signal $x_2(t)$ to be detected and an auxiliary signal $a_2(t)$ so that: $y(t) = x_2(t) + a_2(t)$. Both the auxiliary signal $a_1(t)$ and the auxiliary signal $a_2(t)$ are herein constituted by triangular or sawtooth signals.

In another known arrangement of this type (see ref. 2 and 3 of chapter D), auxiliary signals $a_1(t)$ and $a_2(t)$ are used which are each formed by a linear combination of signals which change in accordance with Rademacher functions.

In these known arrangements the signals $s(t)$ and $y(t)$ are converted in a particularly simple manner into a digital signal, namely by considering only the sign of these signals. In this way the multiplier means are reduced to a single modulo-2-adder.

For taking an unambiguous decision the condition must yet be set that the signal $y(t)$ or its digital representation is not periodical. By choosing the auxiliary signals in the way as is done in the known arrangements described above, these conditions can be satisfied.

In these known arrangements, the magnitude of the signal produced at the output of the integration means is compared with the reference level in the detection means once in each period T. These detection means for example, supply an "1" pulse if the magnitude of this signal rises above this reference level and in the other case it supplies a "0" pulse. The occurrence of a "1" pulse at the output of the detection means now signifies that the tone signal $x_2(t)$ is present in the information signal $x_1(t)$ whilst a "0" pulse indicates that this is not the case.

In these known correlation arrangements the height of the reference level in the detection means is influenced by a plurality of factors. As in the first place the starting instant of the known tone signal $x_2(t)$ in the information signal $x_1(t)$ is not known [for example in the communication systems indicated in chapter (A) (1)] the correlation arrangement should continuously be on stand by. The result thereof is that the output signal of the integration means will differ from zero owing to noise signals which are always present in the telecommunication system. The output signal of the integration means produced in response to these noise signals will be hereinafter indicated by noise level. Consequently, the reference level in the detection means must have such a value that it exceeds at all times the noise level. In the second place it is often required that the presence of the tone signal $x_2(t)$ in the information signal $x_1(t)$ must be ascertained within a given time interval $\tau_0$ (the integration time) after the starting instant of the signal $x_2(t)$. This requirement determines the bandwidth of the discrimination curve. This requirement is furthermore coupled with an additional requirement, namely that a given spread of $2 \Delta f_0$ must be permissible with respect to the exact frequency $f_0$ of the tone signal $x_2(t)$. This means that if the tone signal $x_2(t)$ received is shifted in frequency over $\pm \Delta f_0$ this tone signal should yet be recognized within said time $\tau_o$, as being the known tone signal $x_2(t)$. Because of these two requirements a value must be attributed to the reference level in the detection means so that the output signal of the integration means should exceed the reference level within said time interval of length $\tau_o$ when a tone signal $x_2(t)$ having a frequency of $\pm \Delta f_o$ is applied to the arrangement. If a larger value of $2 \Delta f_o$ is required, together with a relatively long integration time $\tau_o$, then problems arise in the known arrangements because of the fact that a value must be attributed to the reference level used in the detection means which is in the order of magnitude of the noise level. The result of the detection is then strongly affected by the magnitude of the noise signals.

SUMMARY OF THE INVENTION

It is an object of the invention to provide a correlation arrangement of the type indicated in chapter (A) (1) in which for a given value of the sampling period T the reference level which is used in the detection means is not affected by the combined requirements concerning the maximum duration of the integration time $\tau_o$ and the spread $2 \Delta f_0$.

It is a further object of the invention to provide a correlation arrangement which can be implemented in digital techniques.

In brief, these and other objects are achieved by having a generation means produce a periodic series comprising periodic repetition of a subseries.

By using the measures according to the invention it is now achieved on the one hand that the reference level in the detection means can be choosen at a sufficiently large distance from the noise level independent of the spread $2 \Delta f_0$. On the other hand it has been achieved that the generation means can now be constructed in a particularly simple manner. Owing to the periodical character of the signal which is produced by these generation means the consecutive values of a period of this signal can now be stored in a store (for example a ROM). These values can be read in the correct sequence by means of a counter.

SHORT DESCRIPTION OF THE FIGURES

REFERENCES

1. Detection, Estimation, and Modulation Theory; Part I; H. L. van Trees; John Wiley and Sons, Inc., 1968
2. Dutch patent application No. 288.711.

3. The Measurements of correlation Functions in correlators using Shift-invariant independent functions; J. B. H. Peek; Philips' Research reports Supplement No. 1, 1968.
4. A new method for computing correlation functions; Dr. P. Jespers; P. T. Chu, A. Fettweis; International Symposium on information theory, Brussels, Sept. 3-7, 1962.
5. System identification; P. Eykhoff; John Wiley and Sons 1974, pages 300–302.
6. Arithmetic operations in digital computers; R. K. Richards; D. van Nostrand company 1957.
7. A fast amplitude approximation for quadrature pairs; G. H. Robertson; Bell System Technical Journal, Vol. 50, No. 8, October 1971, pages 2849–2852.
8. Linear approximations to $\sqrt{x^2 + y^2}$ having equiripple error characteristics; A. E. Filip; IEEE Transactions on audio and electroacoustics, Vol. AU-21, No. 6, December 1973, pages 554–556.

Some thoughts on cross-correlation arrangements

The construction of a known cross-correlation arrangement.

Figure 1:
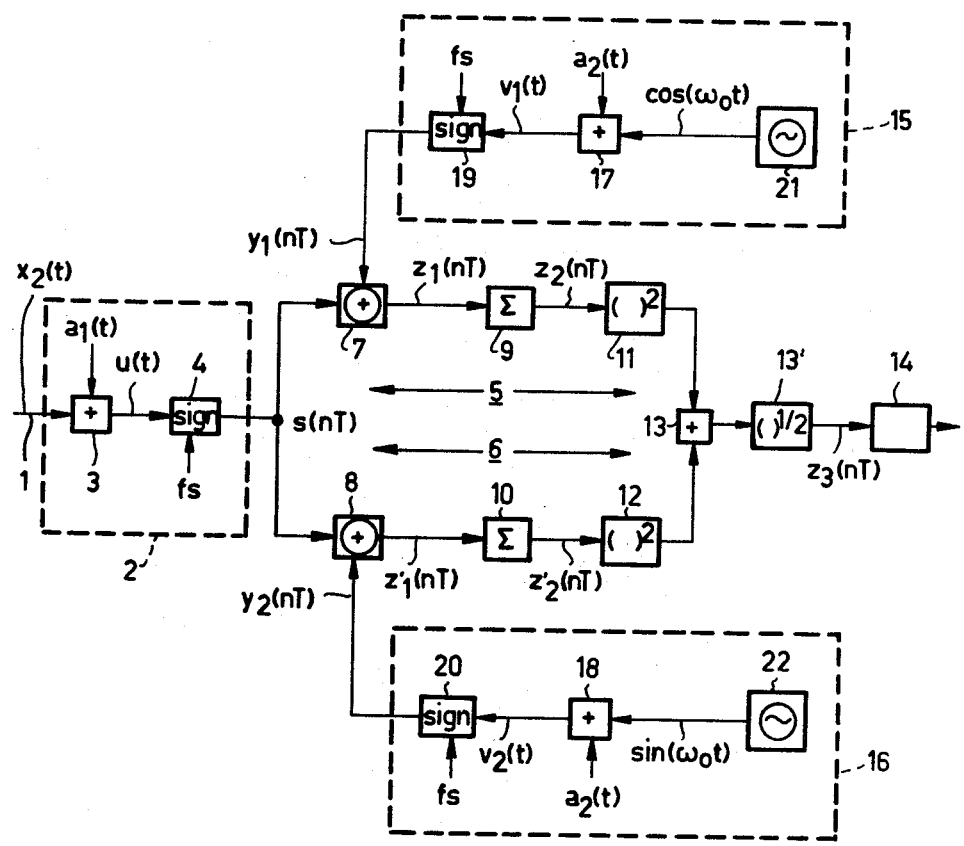
FIG. 1 shows a known embodiment of a cross-correlation arrangement.

FIG. 1 shows a known cross-correlation arrangement (see ref. 2) for a harmonic tone signal $x_2(t)$ with unknown phase and which is received together with, for example, white noise. The tone signal and the white noise together constitute the information signal $x_1(t)$. In what follows hereinafter it will be assumed that this information signal will be exclusively formed by the tone signal $x_2(t)$. The arrangement shown comprises an input 1 through which the signal $x_2(t)$ is applied to an input channel 2 which is provided with an adder 3 as well as with a sampling and coding device 4. In the adder 3 the signal $x_2(t)$ is added to an auxiliary signal $a_1(t)$ to form a sum signal $u(t) = x_2(t) + a_1(t)$. In the device 4 this sum signal is sampled and coded for producing sum signal samples $(nT)$. To that end sampling pulses are applied to this device. Said sampling pulses having a period $T = 1/f_s$, where $f_s$ is the sampling frequency. More in particular the device 4 supplies a "1" pulse if the polarity of $u(t)$ is positive (in other words if sign $[u(t)] > 0$) and it supplies a ("0" pulse if the polarity of $u(t)$ is negative (sign $[u(t)] < 0$). In the arrangement shown the output pulses of the device 4 are applied to two parallel correlation channels 5 and 6. Each of these channels comprises a series arrangement of a multiplier device 11, 12. The outputs of these squaring devices are connected to an adder 13, whose output signal is applied through a root extractor 13' to a detector 14 for comparing the output signal of the root extractor 13' with a predetermined reference level. More in particular this detector supplies, for example, a "1" pulse if the output signal of the root extractor 13' exceeds the reference level. If not then the detector supplies a "0" pulse.

Signals which are derived from generation means 15 or 16 are also applied to the multiplier devices 7 and 8. These generation means are each constructed in the same manner as the input channel 2 and thus comprise each a series arrangement of an adder 17 or 18 and a sampling and coding device 19 or 20. A signal $A\cos\omega_o t$ which is produced by a generator 21 is now applied to the input of the adder 17. A signal $A \sin \omega_o t$ which is produced by a generator 22 is applied to the input of the adder 18. An auxiliary signal $a_2(t)$ is applied to a second input of each of the adders 17 and 18 for producing sum signals $v_1(t)$ and $v_2(t)$ which satisfy the relations:

$$v_1(t) = a_2(t) + A\cos \omega_o t \quad (1)$$

$$v_2(t) = a_2(t) + A\sin \omega_o t \quad (2)$$

In these expressions $\omega_o/2\pi$ represents the frequency of the tone signal $x_2(t)$ to be detected. These signals $v_1(t)$ and $v_2(t)$ are sampled and coded by the devices 19 or 20 for producing signal samples $y_1(nT)$ and $y_2(nT)$ respectively. Like the device 4 also the devices 19 and 20 supply a "1" pulse if sign $[v_1(t)] > 0$ and sign $[v_2(t)] > 0$ respectively and they supply a "0" pulse if sign $[v_1(t)] < 0$ and sign $[v_2(t)] < 0$ respectively. These pulses may be considered as one-bit code words. The one-bit code words $y_1(nT)$ and $y_2(nT)$ are now multiplied in the respective multipliers 7 and 8 by the one-bit code words $s(nT)$. As the code words $s(nT)$, $y_1(nT)$ and $y_2(nT)$ are composed in a simple manner, namely as one-bit digital code words the multipliers 7 and 8 may be constructed in a particularly simple manner, namely as modulo-2-adders. These modulo-2 adders 7 and 8 now supply one-bit code words $z_1(nT)$ and $z'_1(nT)$ respectively. Also the integrating networks 9 and 10 may now be constructed in a simple manner as up-down counters.

To sample the signals $u(t)$, $v_1(t)$ and $v_2(t)$ sampling pulses are applied to the devices 4, 19 and 20 which occur at a period T and which are produced by a sampling pulse generator not shown.

The auxiliary signals $a_1(t)$ and $a_2(t)$ which can be obtained by means of auxiliary signal generators, not shown, are each preferably formed by means of a linear combination of functions which change according to Rademacher functions, as is, for example, extensively described in references 2 and 3.

Cross-correlation arrangements in general.

In a cross-correlation device an estimation is made of the correlation function R ($\tau$) which is defined as follows:

$$R(\tau) = \lim_{T_o \to \infty} \int_0^{T_o} x(t) y(t-\tau) dt \quad (3)$$

where $T_o$ represents the integration interval.

In the embodiment shown in FIG. 1 in which signal samples with a period T are applied to the integrating networks 9 and 10 this integration interval having a length $T_o$ may also be indicated by the number of signal samples which are applied in this period $T_o$ to each of the integrating networks 9 and 10.

Assuming this number to be equal to N it then holds:

$$N = \text{integer } [f_s T_o] \quad (4)$$

If at the beginning of the integration interval the contents of the integrating network 9 and 10 are equal to zero and if the starting instant of the integration interval having the length $T_o$ the integrating network 9 produces an output code word:

$$z_2[(N-1)T] = \sum_{n=0}^{N-1} s(nT) \cdot y_1(nT) \quad (5)$$

In a corresponding manner the integrating network 10 produces an output code word:

$$z'_2[(N-1)T] = \sum_{n=0}^{N-1} s(nT) \cdot y_2(nT) \quad (6)$$

In these expressions it holds that:

$$s(nT) = \text{sign}\,[x_2(nT) + a_1(nT)] \quad (7)$$

$$y_1(nT) = \text{sign}\,[A\cos(n\omega_o T) + a_2(nT)] \quad (8)$$

$$y_2(nT) = \text{sign}\,[A\sin(n\omega_o T) + a_2(nT)] \quad (9)$$

Let us assume that the tone signal $x_2(t)$ is constituted by a sinusoidal signal having the frequency $\omega/2\pi$ and assume:

$$\Delta\omega = \omega - \omega_o \quad (10)$$

If now the correlation device shown in FIG. 1 is started at the instant $t = 0$ which corresponds to the $o^{th}$ sampling instant $n = 0$ then it can be proved that if $\Delta \omega$ is much smaller than the sampling frequency $f_s$, (that is to say $\Delta \omega << 2\pi f_s$), the output signal $z_3(nT)$ of the root extractor 13' at the end of an integration interval having a length $nT$ is approximated for large values of $n$ by the expression:

$$z_3[(n-1)T] = \frac{\sin n\Delta\omega T/2}{2\sin\Delta\omega T/2} \quad (11)$$

Figure 2:
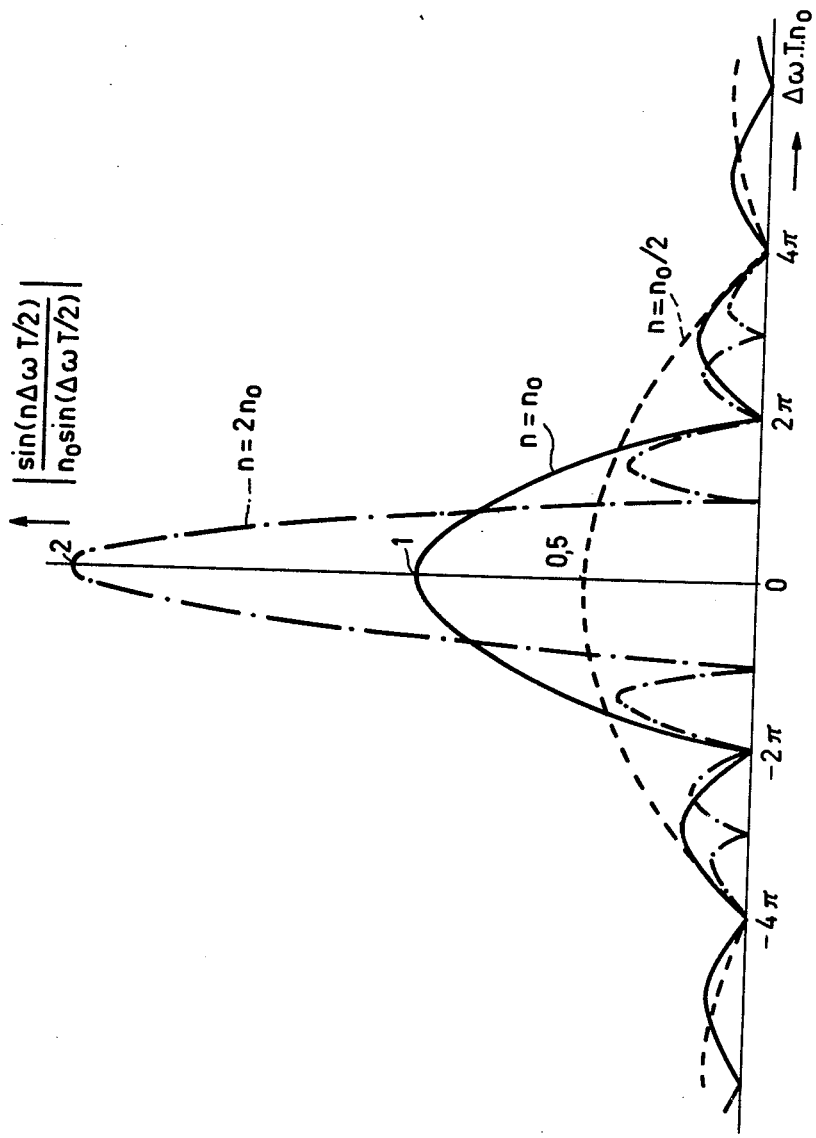
FIG. 2 and FIG. 3 show diagrams to explain the operation of the arrangement shown in FIG. 1.

Expression (11) represents a function of two variables, namely of $n$ and $\Delta\omega$. FIG. 2 shows three graphs of this function for three values of $n$, namely $n = n_o$, $n = 2n_o$ and $n = n_0/2$ where $n_o$ is any arbitrary number. These curves illustrate the influence of the length of the integration interval $nT$ as a function of $\Delta\omega$ on the output signal $z_3(nT)$. More in particular FIG. 2 shows for said three values of the independent variable $n$ the curves which satisfy the expression:

$$\frac{\sin n\,\Delta\omega T/2}{n_o \sin \Delta\omega T/2} \quad (12)$$

The values of $\Delta\omega\,Tn_o$ are plotted along the X-axis. Thus, these curves represent the output signal $z_3(nT)$, the signal sample $z_3(n_oT)$ which is associated with a given integration interval having a length $n_oT$ being normalized to the value one for the value $\Delta\omega = 0$. This FIG. 2 now shows that with an increasing length of the integrating interval $nT$, that is to say with an increasing value of $n$ the distance between the first zero crossing points of the curves, that is to say those zero crossing points which are nearest to the value $Tn_o=0$ decreases.

In cross-correlation arrangements which are constructed for detecting signals, the starting instant being unknown, in contra distinction to what was described above, a check is made by means of the detector 14 not at the end of an integration period, that is after $nT$ seconds, but in each sampling period $T$ whether the output code word of the root extractor 13' has exceeded the reference level. If in this situation the output code words of the root extractor 13' which occur with a period $T$ are again represented by $z_3(nT)$ then it can be said mathematically that $z_3(nT)$ has exceeded the reference level in an integration interval having a length of $nT$, if the maximum value which $z_3(nT)$ assumes in this interval is situated above this reference level. For cross-correlation arrangements operating in this manner the frequency detection characteristic $p(n, \Delta\omega)$ can be defined by the relation:

$$p(n, \Delta\omega) = \max z_3(mT) \quad (13)$$

$$0 \leq m \leq n$$

which in turn can be approximated by $$\max_{0 \leq m \leq n} \left[\frac{\sin m\Delta\omega T/2}{2n_o \sin\Delta\omega T/2}\right] \quad (14)$$

Figure 3:
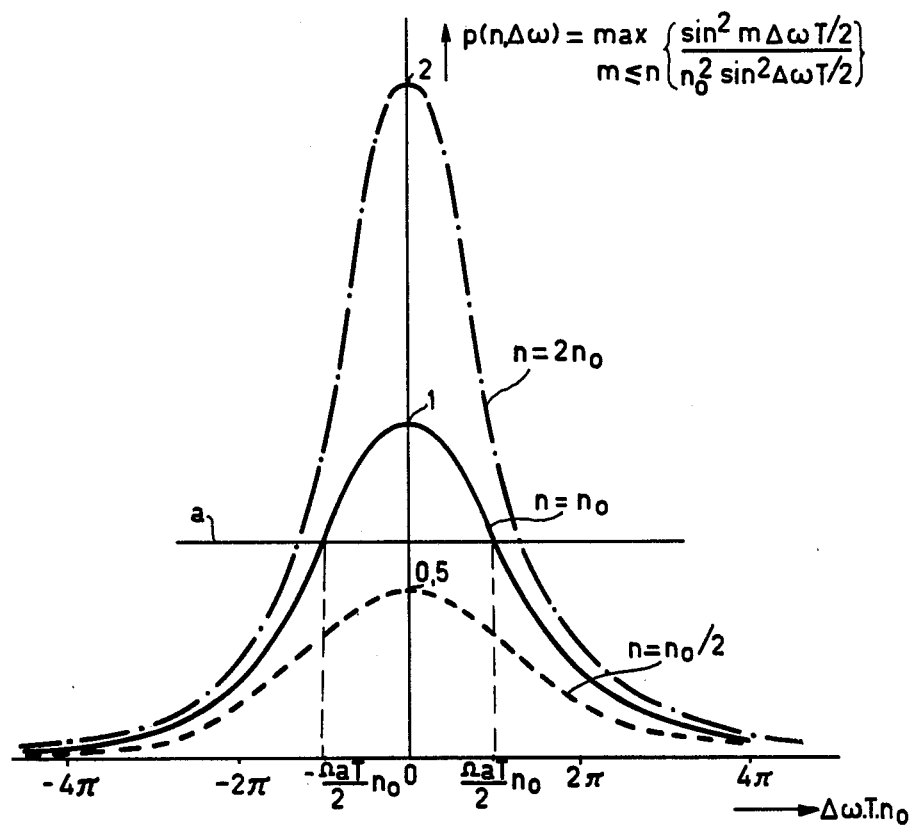

FIG. 3 again illustrates the influence of the value of $n$ on $p(n, \Delta\omega)$. To this end FIG. 3 shows the curves for the same three values of $n$ as in FIG. 2, namely the values $n = n_o$; $n = 2n$ and $n = n_o/2$ which satisfy the expression (14). As for FIG. 2 it holds that $n_O$ has any arbitrary value and a standardization has been introduced in such a way that the curve which relates to the value $n = n_o$ has the maximum value one. If $n_o$ represents an odd number then the value $n = n_o/2$ has no physical meaning. However, this value is exclusively used for illustration. As FIG. 3 shows, the width of the curve increases when the value of $n$ increases.

In practice a number of requirements are imposed on each cross-correlation arrangements which in the first place amount to that tone signals whose starting instant is undetermined should be detected if they are within a predetermined frequency band and are present for at least a given minimum time $\tau_o$. If more in particular $\omega_0/2$ represents the nominal frequency for which the expressions (8) and (9) apply then the above requirement means mathematically that a tone signal having a frequency $\omega_1/2\pi$ which satisfies the expression:

$$|\omega_1 - 107_o| < \Omega_a \quad (15)$$

must be detected for a predetermine value of $\Omega_a$ if this signal is present for at least a time interval $\tau_o$. Furthermore, as a rule a tone signal having a frequency $\omega_2/2\pi$ which satisfies the expression:

$$|\omega_2 - \omega_o| > \Omega_b >> \Omega_a \quad (16)$$

may not be detected for a predetermined value of $\Omega_b$, and also not in the case that it is continuously present. In the second place, at a given false alarm rate, a tone signal having a frequency which satisfies the expression (15) should have a detection probability which is as high as possible.

With reference to FIG. 3 it will now be proved that for the known cross-correlation arrangements it will as a rule not be possible to satisfy all the above requirements simultaneously.

As has already been observed tone signals having a frequency $\omega_1/2\pi$ which satisfies the expression (15) should be detected if they are present for at least a time interval $\tau_o$ or within $$N_o = \tau_o/T.$$

For a given value of $N_o$ a detection level can now be fixed which is used as reference level in the detector. As a rule this detection level will be chosen such that the chance of detection for signals having a frequency $\omega/2\pi = \omega_o/2\pi$ ($\Delta\omega = 0$) is optimum. In FIG. 3 the horizontal line a indicates a detection level for the curve for which $n = n_o$. Once the detection level has been fixed this also determines the value of $\Omega_a T$ (see FIG. 3). A given value of the sampling frequency $f_s = 1/T$ then fixes both the value of $N_o$ (see expression (17)) and the value of $\Omega_a$. Once the sampling frequency $f_s$ has been fixed then $\Omega_a$ cannot be chosen freely anymore. If the value of $\Omega_a$ and T are both fixed in advance then this fixed requirement can be satisfied by choosing a matched detection level. Especially with a large value of $\Omega_a$ and a small value of $N_o = n_o$ difficulties may occur if the noise level is relatively high, as can be seen from FIG. 3. This results in a serious increase in the false alarm rate which is impermissible in practical systems.

From the above it is clear that the requirements mentioned generally influence each other mutually. It has consequently become a particularly difficult problem to satisfy all requirements simultaneously, which results in compromise solutions, which particularly aim at a lowest possible value of the sampling frequency $f_s = 1/T$.

Figure 4:
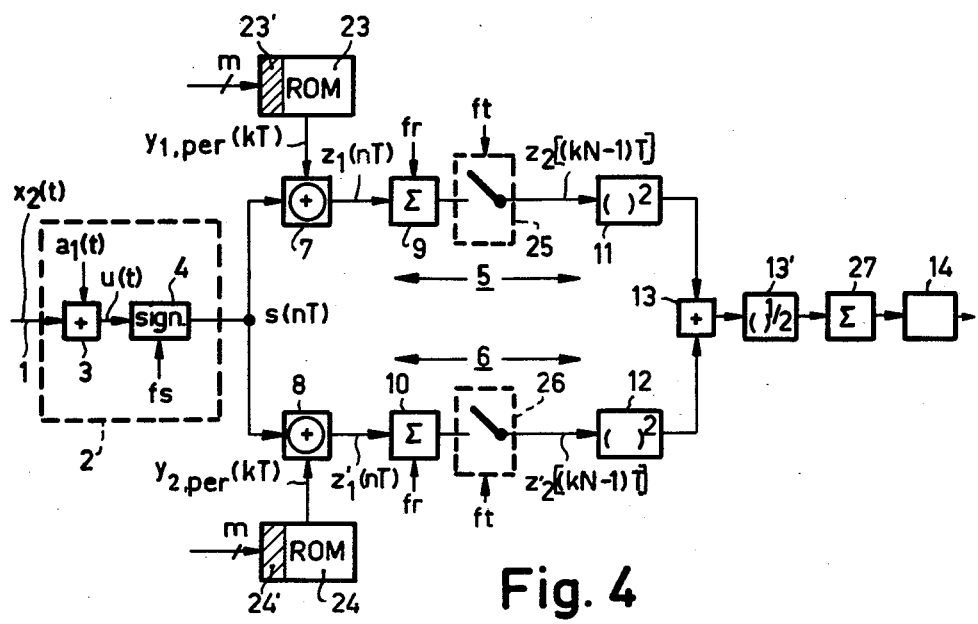
FIG. 4 shows an embodiment of the cross-correlation arrangement according to the invention.

(F) The cross-correlation arrangement according to the invention (FIG. 4).

Identification of the system elements.

The problems illustrated in the preceding chapter which are associated with the known cross-correlation arrangements described are now mitigated by the arrangement according to the invention shown in FIG. 4. More in particular the parameters which characterized the requirements enumerated in the preceding chapter may be chosen independently of one another.

In the arrangement in FIG. 4 the elements corresponding to FIG. 1 are given the same reference numerals. More in particular in this arrangement a generation means 23 or 24 (compare 15 and 16 in FIG. 1) are arranged for producing a periodical series $\{y(nT)\}$ of one bit code words which series is formed by a periodical repetition of a sub-series $\{y_{per}(kT)\}$ which is formed by a fixed number of N signal samples $y_{per}(kT)$ where $k = 0,1,2, \ldots$ N-1, which occur one after the other with a period T, the relation between the signal samples $y_{per}(kT)$ and the tone signal $x_2(t)$ being given by the expression:

$$y_{per}(kT) = \text{sign } x_2 \{[(p+k)T] + a_2[(p+k)T]\} \tag{18}$$

where:

p is a fixed and, possibly, also an integral number, $x_2[(p+k)T]$ is the instantaneous value of the tone signal $x_2(t)$ at the instant $[(p+k)T]$;

$a_2[(p+k)T]$ the instantaneous value of the second auxiliary signal $a_2(t)$ at the instant $(p+k)T$. The duration NT of the sub-series $\{y_{per}(kT)\}$ is smaller than or equal to the minimum time interval $\tau_o$ during which the known tone signal $x_2(t)$ is present in the information signal $x_1(t)$.

As both the signal samples $x_2(nT)$ and the signal samples $a_2(nT)$ are known already in advance, the N one-bit code words $y_{per}(nT)$ can be calculated. For the correlation channel 5 in which a periodical series $\{y_2(kT)\}$ is used the periodic character of this series can be mathematically represented by:

$$y_1(kT) = \text{sign } [\cos k \Omega_o T + a_2(kT)] = y_{1,per}(kT) \text{ when } 0 \leq k \leq N$$

$$= y_1[(k-N)T] \text{ where } K \geq N \tag{19}$$

For the correlation channel 6 in which a periodical series $\{y_2(kT)\}$ is used the corresponding expression $$y_2(KT) = \text{sign } [\sin k \Omega_o T + a_2(kT)] = y_{2,per}(kT)$$
where $o = k < n$ $$= y_2[(k-N)T] \text{ where } K \geq N \tag{20}$$

holds.

These known N one-bit code words $y_{1,per}(kT)$ and $y_{2,per}(kT)$ may now be stored in a storage medium, for example a ROM and may be read in a conventional, known manner.

The product signal samples $z_1(nT)$ and $z'_1(nT)$ which are produced by the modulo-2-adders 7 and 8 respectively are counted in the integrating networks 9 or 10 which are constructed as up-down counters. The contents of these counters is read each time after N signal samples $s(nT)$ have been applied to the two channels 5 and 6. This is symbolically shown in FIG. 4 by the switches 25 and 26 which are controlled by clock pulses $f_r$. After the contents of the counters 9 and 10 have been read they are reset by means of resetting pulses $f_r$. In this manner signal samples $z_2[(kN-1)T]$ and $z'_2[(kN-1)T]$ are produced at the output of the switches 25 and 26 respectively with a period NT. These signal samples are again, as in the known arrangement, squared in the devices 11 and 12, the results of this squaring action are added in the adder 13. From the sum obtained from the squares the square root is again taken by means of the device 13' and the result is applied to a second integrating network 27. More in particular the network 27 may be constructed as an accumulator. A change in the contents of the accumulator 27 now occurs each time at the instants $nT = (kN-1)T$. The output signal sample of the integrating network 27 will now be indicated by $z_3[(kN-1)T.]$ Its magnitude can be mathematically represented by the expression:

$$z_3[(kN-1)T] = \sum_{m=1}^{k} \{z_2^2[(mN-1)T] + z'^2_2[(mN-1)T]\}^{\frac{1}{2}} \tag{21}$$

Figure 5:
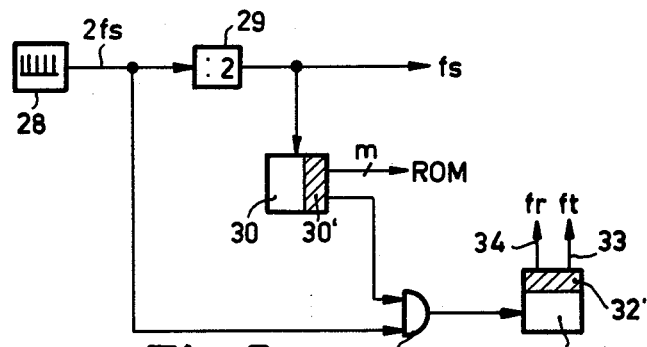
FIG. 5 shows a control generator for use in the arrangement of FIG. 4.

For completeness FIG. 5 shows an embodiment of a generator which is arranged for controlling the correlation arrangement shown in FIG. 4. This generator comprises a clock-pulse generator 28 which produces clock-pulses at, for example, a frequency $2f_s$. These clock pulses are applied to a frequency divider 29 which produces clock pulses at a frequency $f_s$ and which are applied to the sampling and coding device 4 (compare FIG. 4). At the same time these so-called sampling pulses are applied to a modulo-N-counter 30. A decoding network 30' which is provided with m parallel output conductors is connected to this counter 30. This network 30' produces at its m parallel outputs m-bit code words with parallel bits. Each of these m-bit code words is characteristic for a given counter position of the counter 30. These code words are now each applied as address code to the two storage media 23 and 24 through address decoder 23' and 24' connected thereto. In FIG. 5 the m parallel outputs of the network 30' are symbolically indicated by the

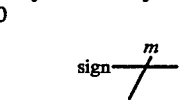

It should be noted that m is equal to the first integral number which is larger or equal to $\log_2 N$. Besides the said m outputs the network 30' in the embodiment shown is provided with an additional output at which a pulse is produced if the counter 30 has attained its highest counting position (for example corresponding to the number N-1). This additional output is applied to an AND-gate 31 to which the output pulses of the generator 28 are applied. If the counter 30 has attained the counting position N-1 the output pulses of the generator 28 are applied through the AND-gate 31 to a counter 32 which is, for example, constructed as modulo-2-counter. A decoder network 32' having two outputs 33 and 34 is connected to this counter 32. At a predetermined first counting position of the counter 32 the decoder network 32' produces at the output 33 an output pulse $f_p$ which is applied to the two stitches 25 and 26 of FIG. 4. When a second counting position occurs which exceeds the first counting position an output pulse $f_r$ is produced at the output 34 which is applied to the two counters 9 and 10 of FIG. 4 as resetting pulse.

Operation of the correlation arrangement according to FIG. 4.

The case is again considered in which a sinusoidal signal with angular frequency $\omega = \omega_o + \Delta\omega$ is applied to the cross-correlation arrangement of FIG. 4. As the integrating networks 9 and 10 of FIG. 4 are reset each time at the instants $nT = [(kN-1)T]$ it means that expression (11) applies to this arrangement so that each term of the series shown in expression (21) is approximately equal to $$\frac{1}{2} \left| \frac{\sin \Delta \omega \, NT/2}{\sin \Delta \omega \, T/2} \right| \quad (22)$$

so that:

$$z_3[(kN-1)T] = \frac{k}{2} \left| \frac{\sin \Delta \omega \, NT/2}{\sin \Delta \omega \, T/2} \right| \quad (23)$$

If, as in chapter (E.2) it is assumed that the tone signal $x_2(t)$ is present for at least one period $\tau_o$ then at least $N_o = \tau_o/T$ (compare expression (17)) signal samples are available to determine the presence of this tone signal. The result is that at least $k_o = N_o/N$. (24) signal samples $z_3 [(kN-1)T]$ become available at the output of the integrating network 27. In expression (24) it has already been assumed that N has been chosen such that $N_o$ can be divided by N which can be realized by adapting the sampling frequency $f_s = 1/T$.

Figure 6:
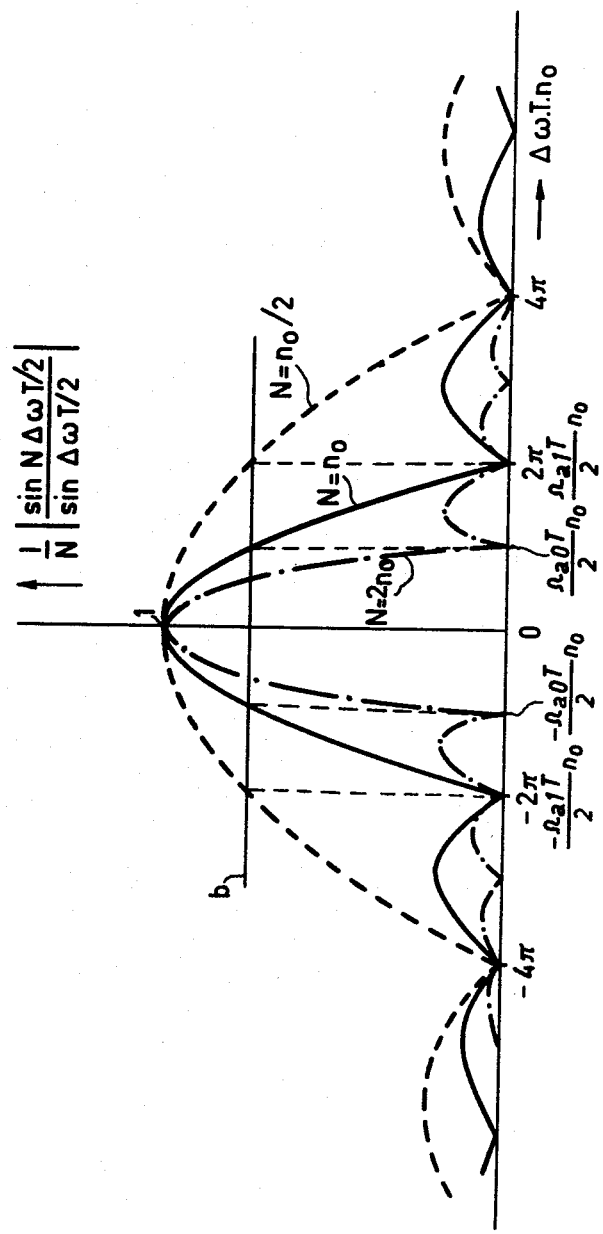
FIG. 6 shows diagrams to explain the operation of the arrangement shown in FIG. 4.

FIG. 6 shows a graphical representation of the expression (23). More in particular FIG. 6 shows the function which depends on the variable N and the variable $\Delta \omega$ $$\frac{2 z_3[(k_o - 1)T]}{N_o} = \frac{1}{N} \frac{\sin N \Delta \omega \, T/2}{\sin \Delta \omega \, T/2} \quad (25)$$

for three different values of N; namely the values $N = n_o$, $N = 2n_o$ and $N1n_o/2$. As in the preceding FIGS. 2 and 3 the independent variable $\Delta \omega \, Tn_o$ is plotted along the X-axis of FIG. 6. Also here $n_o$ represents any arbitray integral number which is smaller than $N_o$. For all curves shown in FIG. 6 it holds that $z_3[(k_oN-1) T] = N_o/2$ for $\Delta \omega = 0$. It can be seen from this figure that the distance between the first two zero crossing points of a curve (that is to say those zero points which are closest to the abscisa value $\Delta \omega = o$) increases when N is decreased, that is to say the integration interval of the integrating networks 9 and 10 in correlation channels 5 and 6.

If now with respect to the noise level to be expected a given optimum detection level is chosen, for example of a size which is illustrated in FIG. 6 by the straight line $b$ than the value for $\Omega_a$ can be freely adjusted. Namely, for a given value of the sampling period T the value for $\Omega_a$ results from the points of intersection of the straight line $b$ with the various curves. FIG. 6 shows two values for $\Omega_a$ namely $\Omega_{a,o}$ and $\Omega_{a,1}$. In contradistinction to the known correlation arrangements in which $\Omega_a$ mainly depends upon the choice of the detection level in the arrangement according to the invention described above $\Omega_a$ is determined by the length of the integration interval NT which consequently is chosen to be smaller than the time $\tau_o = N_oT$ during which the tone signal $x_2(t)$ is at least present and which is determined by the period with which the integrating networks 9 and 10 in the correlation channels 5 and 6 are read and reset.

By using the measures according to the invention an extra degree of freedom has thus been realized so that all requirements enumerated above can be satisfied in a manner independent of one another.

The integrating network 27 of FIG. 4.

Figure 7:
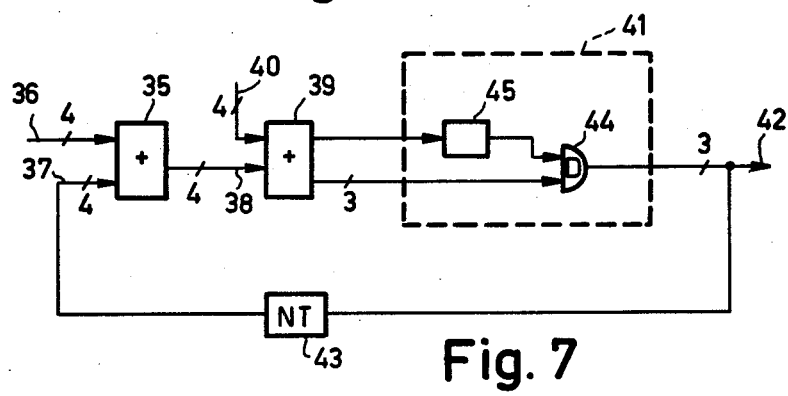
FIG. 7 shows an integrating network for use in the arrangement of FIG. 4.

In the description of FIG. 4 it was assumed for simplicity that the integrating network 27 is constituted by an accumulator. However, this would cause the output signal of this integrating network to increase continuously for all types of signals $x_1(t)$ which are applied to this cross-correlation arrangement. For, numbers of the same (positive) polarity are continuously applied to this integrating network owing to the use of the squaring devices. A result is that also if no tone signal $x_2(t)$ is present in the information signal $x_1(t)$ the detection level is yet exceeded after some time. Without influencing the form of the curves shown in FIG. 6 this integrating network 27 is preferably constructed in a manner as shown in FIG. 7. This integrating network is constituted by a first adder 35 having two sets of parallel input conductors 36 and 37 which are represented by the symbol just as in FIG. 5. In the embodiment shown n has been chosen equal to 4. The parallel outputs 38 of this adder 35 are connected to corresponding inputs of a second adder 39 to which furthermore a second set of parallel conductors 40 is connected. The outputs of this adder 39 are applied through a non-linear network 41 on the one hand to the output 42 and on the other hand to a delay device 43 the output of which is connected to the inputs 37 of the adder 35. Via the inputs 36 the output signal of the device 13' (c.f. FIG. 4) is applied to this adder and via the inputs 40 a negative number −B to the adder 39. Now such a delay is attributed to the delay device 43 that the total delay time which is introduced by the circuit constituted by the adder 39, the network 41 and the delay device 43 is equal to NT.

The network 41 is constituted in this embodiment by an AND gate circuit 44. The symbol shown in the Figure for the AND-gate circuit 44 represents a plurality of parallel AND-gates. This plurality is equal to the plurality of parallel input conductors. Thus, in the embodiment shown this means that each of the three outputs of the adder 39 which are jointly represented in the Figure by the symbol

comprises an AND-gate. These AND-gates are controlled by output pulses of, for example a monostable multivibrator 45 to which the polarity bit of the number produced by the adder 39 is applied. If now a negative polarity is represented by an "0"-bit and a positive polarity by an "1" bit then when a negative polarity bit is produced the AND-gates 44 become non-conductive and become conductive when a positive polarity bit is produced. The operation of this integrating network is now as follows. In each period NT a fixed amount B is subtracted from the number which is produced by adder 35. If the number produced by adder 39 becomes negative the network 41 produces the number zero.

The value of the number B can be fixed on the basis of the noise level to be expected. If namely, the information signal $x_1(t)$ is exclusively formed by a noisy signal whose magnitude is known then the output signal of this integrating network should decrease towards the value zero. Besides on the basis of the value of the noise level to be expected the value of B can be co-determined by the value of $\Omega_b$ defined in expression (16).

Additional remarks.

In the cross-correlation arrangements which are shown in FIGS. 1 and 4 squaring devices 11 and 12 are used. These squaring devices can be constructed in a simple manner; namely by means of an multiplier to which the number to be squared is applied both as multiplicator and as multiplicant.

The root extractors 13' shown in said Figures may each be constructed as a minicomputer in which, for example, an algorithm is used as described in references 6, 7 or 8.

In practical constructions of cross-correlation arrangements, however, no root extractor is used. For this device changes only the size of the output code words of the adder 13. This has consequences only for the height of the reference level which is used in the detection device.

Besides dispensing with the root extractor device 13' the arrangement according to the invention shown in FIG. 4 can be simplified still further. Namely, the squaring devices 11 and 12 may be replaced by devices which only produce the absolute values of the numbers which are produced by the integrating networks 9 and 10. In this case the output signal of the adder 13 which is now directly connected to the integrating network 27 is approximately given by:

$$\frac{K(\Phi)}{2} \frac{\sin N \Delta \omega T/2}{\sin \Delta \omega T/2} \qquad (26)$$

In this expression $K(\phi)$ represents a function of the independent variable $\phi$. This variable $\phi$ represents the phase of the tone signal $x_2(t)$ at the instant $t = (kN-1)T$. This expression (26) now differs from the expression (22) by the presence of the factor $K(\phi)$ which, however, has a particularly little influence as its value is situated between 1 and $\sqrt{2}$. It is true, that in contradistinction to those correlation arrangements in which squaring devices are used the input signal at the integrating network 27 is no longer fully independent of the phase of the tone signal $x_2(t)$, but a considerable simplification of the correlation arrangement has been obtained. For the arrangement which supplies the absolute value of a number may be constituted by a plurality of gate circuits which suppress the polarity bit of the numbers which are produced by the integrating networks 9 and 10.

For storing the number $Y_{1,per}(kT)$ and $y_{2,per}(kT)$ the storage media (ROMs) 23 and 24 in FIG. 4 must each have a capacity of N bits. A further reduction by a factor of two is possible as will now be further explained. To this end the output signal samples $y'_{1,per}(kT)$ and $y'_{2,per}(kT)$ of the storage media 23 and 24 are defined in a form which slightly deviates from the expressions (19) and (20).

$$y'_{1,per}[(n+N/2)T] = \text{sign } [\cos(n+\tfrac{1}{2}) \omega_o T + a_2(nT)]$$
when $0 \leq n < N/2$ $$= \text{sign } [\cos(n+\tfrac{1}{2}) \omega_o T - a_2(nT)] \text{ when } -N/2 < n < 0 \qquad (27)$$

$$y'_{1,per}(nT) = y'_{1,per}(n-N)T \text{ when } n \geq N$$

$$y'_{2,per}[(n+N/2)T] = \text{sign}[\sin(n+\tfrac{1}{2}) \omega_o T + a_2(nT)]$$
when $-N/2 \leq n < N/2$ $$y'_{2,per}(nT) = y'_{2,per}(n-N)T \text{ when } n \geq N \qquad (28)$$

From the above expression it follows that:

$$y'_{1,per}[(n + N/2)T] = y'_{1,per}\left[(\frac{N-2}{2} - n)T\right] \qquad (29)$$
when $0 \leq n < N/2$ $$y'_{2,per}[(n + N/2)T] = -y'_{2,per}\left[(\frac{N-2}{2} - n)T\right] \qquad (30)$$
when $0 \leq n < N/2$ This means that only N/2 values of $y'_{1,per}(nT)$ and only N/2 values $y'_{2,per}(nT)$ need be stored.

The introduction of the factor $\tfrac{1}{2} \omega_o T$ in the arguments of the sinus and cosinus functions only means a fixed phase shift and consequently does not affect the result of the correlation. Introducing $-a_2(nT)$ is permitted as this does not affect the required independence of the auxiliary signals (see ref. 3).

In the storage media 23 and 24 now the values of $y'_{1,per}(nT)$ and $y'_{2,per}(nT)$ are stored for those values of $n$ which belong to the interval $0 \leq n < N/2$. If these values are numbered from zero to $(N/2)-1$ inclusive, then these values for $y'_{1,per}$ and $y'_{2,per}$ are read in the period $kN \leq n < KN+N/2$ where $k = 0,1,2, \ldots$ in the sequence $0,1,2, \ldots (N/2)-1$ and thereafter in the period $kN+N/2 \leq n < (k+1)N$ where $k = 0,1,2, \ldots$ in the reverse sequence $(N/2)-1, (N/2)-2, (N/2)-3, \ldots 2,1,0$. In the latter interval the polarity bit of $y'_{2,per}(nT)$ is then also inverted in accordance with expression (30).

What is claimed is:

1. A cross-correlation arrangement for determining the presence or absence of at least one tone signal $x_2(t)$, having a known frequency and having a given minimum time duration $\tau_o$, in an information signal $x_1(t)$ whose form and frequency are unknown, said arrangement comprising an input channel means for receiving the information signal $x_1(t)$, said input channel comprising:

means comprising adder means and sampling and coding means coupled to said adder means for producing a first series $\{s(nT)\}$ of sum signal samples, said sum signal samples $s(nT)$ being produced with a sampling period T, the relationship between each of the sum signal samples $s(nT)$ and information signal samples $x_1(nT)$ being given by $s(nT) = \text{sign } [x_1(nT) + a_1(nT)]$, in which expression $a_1(nT)$ represents a sample of a predetermined auxiliary signal;

a pulse generator means coupled to said sampling means for producing sampling pulses with a period T for controlling the sampling means;

at least two correlating channels each comprising:

multiplying means coupled to said sampling means for producing a series $z_1(nT)$ of signal samples $z_1(nT)$ occurring with a period T, the relation between the signal sample $z_1(nT)$ and the signal samples $s(nT)$ and $y(nT)$ being given by the expression $z_1(nT) = s(nT) \cdot y(nT)$, first integration means coupled to said multiplying means to which said signal samples $z_1(nT)$ are applied; and means coupled to said first integration means for converting the integration means output signals into a unipolar signal;

adder means having inputs coupled to said converter means respectively and an output;

second integration means coupled to said adder output;

detection means having an input coupled to said second integration means for comparing the signals applied to the detection means with a predetermined reference level and for producing an output signal which characterizes the presence or absence of the tone signal $x_2(t)$ in the information signal $x_1(t)$; and a pair of generation means coupled to said multiplying means respectively for producing a periodical series $\{y(nT)\}$ comprising a periodical repetition of a sub-series $\{y_{per}(kT)\}$ including of a plurality of N signal samples $y_{per}(kT)$ where $k = 0, 1, \ldots N-1$ which occur one after the other with the sampling period T, the relation between the signal samples $y_{per}(kT)$ and the tone signal $x_2(T)$ being given by the expression $y_{per}(kT) = \text{sign } \{x_2 [(p+k)T] + a_2 [(p+k)T]\}$ where $p$ represents a fixed number; $x_2(p+k)T$ the instantaneous value of the tone signal $x_2(t)$ at an instant $(p+k)T$ and $a_2(p+k)T$, the instantaneous value of a second auxiliary signal $a_2(t)$ at the instant $(p+k)T$ and in which the time duration NT of the sub-series $\{y_{per}(kT)\}$ is smaller than or equal to the minimum time $\tau_o$ during which the known tone signal $x_2(t)$ is at least present in the information signal $x_{1(t)}$.

2. An arrangement as claimed in claim 1, further comprises means for periodically producing read pulses and resetting pulses with a period NT, said first integration means being coupled for receiving these read pulses and reset pulses and for producing first integrator output signal samples $z_2(mNT)$ which occur with a period NT, the relation between the signal samples $z_2(mNT)$, the sum signal samples $s(nT)$ and the signal samples $y_{per}(kT)$ being given by the expression:

$$z_2(mNT) \sum_{k=0}^{N-1} s[(k + mN)T] \cdot y_{per}(kT)$$

3. An arrangement as claimed in claim 1, wherein each of said generation means comprises storage means having at least N/2 addressable storage locations for storing at least N/2 signal samples $y_{per}(kT)$.

4. An arrangement as claimed in claim 1, wherein said unipolar means each comprise a square law rectifier.

* * * * *